(12) United States Patent
Boesser et al.

(10) Patent No.: US 8,351,049 B2
(45) Date of Patent: Jan. 8, 2013

(54) INTERFEROMETRIC DEVICE FOR POSITION MEASUREMENT AND COORDINATE MEASURING MACHINE

(75) Inventors: Hans-Artur Boesser, Breidenbach (DE); Siegfried Peter Kluge, Fronhausen (DE); Joerg Lenz, Biebertal (DE); Gerhard Joseph Nickel, Wetzlar (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 528 days.

(21) Appl. No.: 12/459,751

(22) Filed: Jul. 7, 2009

(65) Prior Publication Data

US 2010/0020332 A1    Jan. 28, 2010

(30) Foreign Application Priority Data

Jul. 25, 2008    (DE) .......................... 10 2008 002 968

(51) Int. Cl.
*G01B 11/02* (2006.01)
(52) U.S. Cl. ........................................ 356/500
(58) Field of Classification Search .................. 356/492, 356/493, 496, 498, 500, 519
See application file for complete search history.

(56) References Cited

U.S. PATENT DOCUMENTS

| | | | | |
|---|---|---|---|---|
| 4,632,554 A * | 12/1986 | Pearce | ........................... | 356/484 |
| 4,921,353 A * | 5/1990 | Chiou et al. | .................. | 356/457 |
| 4,972,072 A * | 11/1990 | Hauser et al. | .................. | 250/225 |
| 5,469,260 A | 11/1995 | Takagi et al. | .................. | 356/358 |
| 5,471,300 A * | 11/1995 | Ryan et al. | ..................... | 356/519 |
| 5,883,714 A * | 3/1999 | Jann et al. | ..................... | 356/484 |
| 7,548,321 B2 * | 6/2009 | Rinn | .............................. | 356/500 |
| 2006/0279743 A1* | 12/2006 | Boesser et al. | ................. | 356/500 |
| 2007/0046949 A1 | 3/2007 | Heiden et al. | ................. | 356/498 |
| 2009/0002486 A1 | 1/2009 | Fricke et al. | .................... | 348/95 |
| 2009/0040530 A1* | 2/2009 | Heiden | ........................ | 356/500 |

FOREIGN PATENT DOCUMENTS

| | | |
|---|---|---|
| DE | 196 28 969 C1 | 10/1997 |
| DE | 10 2005 040 661 | 12/2006 |
| DE | 10 2007 030 390 | 1/2009 |
| EP | 0 053 199 A1 | 6/1982 |

* cited by examiner

*Primary Examiner* — Michael A Lyons

(74) *Attorney, Agent, or Firm* — Davidson, Davidson & Kappel, LLC

(57) ABSTRACT

An interferometric device for position measurement of an element moveable in a plane is disclosed. A laser light source measures the position of the moveable element and emits the required measuring light. A beam splitter splits the measuring light into a first partial beam path and a second partial beam path, which each impinge on a reflecting surface of the moveable element via an interferometer. Herein, at least the beam splitter, which splits the measuring light into a first partial beam path and a second partial beam path, and the beam splitter, which directs the third partial beam path onto an etalon via an interferometer, have a respective beam trap associated with them, which traps the light returning from the respective interferometers.

12 Claims, 6 Drawing Sheets

INTERFEROMETRIC DEVICE FOR POSITION MEASUREMENT AND COORDINATE MEASURING MACHINE

This claims the benefit of German Patent Application No. 10 2008 002 968.8, filed on Jul. 25, 2008 and hereby incorporated by reference herein.

The present invention relates to an interferometric device for position measurement.

The invention further relates to a coordinate measuring machine.

BACKGROUND

Since the requirement as to the precision, reproducibility or repeatability of the parameters (position of structures on a substrate or width of structures on a substrate) determined by a coordinate measuring machine has become more stringent, it is now necessary to improve the measuring precision of the interferometer used for position measurement. The interferometers are used to measure the position of the measuring stage which moves in a plane aligned in an X coordinate direction and a Y coordinate direction.

German Patent Application DE 10 2007 030 390.6 discloses a coordinate measuring machine and a method for calibrating the coordinate measuring machine. The coordinate measuring machine is for determining the positions of structures on a substrate. Herein, the substrate is placed on a measuring stage moveable in an X coordinate direction and a Y coordinate direction. The structures to be measured are traversed into the optical axis of a measuring objective by means of the measuring stage. The position of the measuring stage is interferometrically determined. The position of the measuring stage is used to ultimately determine the position of the structure on the mask. For interferometrically determining the position of the measuring stage, at least one laser interferometer is provided.

German Patent Specification DE 10 2005 040 661 discloses a coordinate measuring apparatus. A reference beam interferometer for determining the position of a traversable stage is disclosed. An evacuated tube is inserted into a longer one of the two interferometer legs. The tube is closed off with windows having a negative temperature coefficient of expansion and a coating for reflecting heat radiation. In the shorter beam path, further, thermal compensation plates are inserted. The reference beam interferometers are used for high-precision distance and position measurements and are an essential part, for example, of mask and wafer measuring apparatuses for the semiconductor industry. The structures of current, high-integrated circuits can thus be measured. These apparatuses need a precision in the range of a few nanometers. It is always necessary to measure the reference wavelength since ambient influences have an effect on the wavelength of the measuring light and would therefore lead to an erroneous measuring value. It is well known that the length of the wavelength of a light beam depends on the index of refraction of the medium traversed by the light beam. It varies due to slow or fast changes in temperature, air pressure and air moisture, or due to changes of the air composition.

U.S. Pat. No. 5,469,260 discloses the principle of the interferometric position measurement. To increase measuring precision, the measuring and reference beam paths are surrounded by tubes open at both ends, into which air is blown, the temperature of which is stabilized in a defined manner.

German Patent Specification DE 196 28 969 C1 discloses a generic reference beam interferometer for determining the position of a traversable stage. In this two-beam interferometer, the influence of wavelength variations due to the ambient temperature is reduced by introducing a light-permeable closed, incompressible body into the longer one of the two interferometer beam paths so that the portions of the reference beam path and measuring beam path extending outside of the body have equal lengths at a certain positioning of the traversable measuring mirror. By these means, changes in the ambient factors have essentially the same effect on the reference and measuring beam paths and cancel each other out.

European Patent Application EP 0 053 199 A1 discloses a measuring method for the iterative measurement of geometric quantities and an apparatus for carrying out this method. The measuring beam path of a laser interferometer device extends in an evacuated cavity variable in length.

In U.S. Pat. No. 5,585,992, measuring errors due to ambient turbulences or fluctuations are compensated by a dual interferometer apparatus.

The ambient influences on the potential wavelength variations can be handled relatively well. However, the optical feedback of the measuring stage into the laser is an important factor. This optical feedback leads to instability in the laser frequency. The laser frequency is the normalized value for the measurement. If this value is changed or the frequency coming from the laser differs from that at the measuring site, the measuring value determined includes an error.

SUMMARY OF THE INVENTION

It is an object of the present invention to improve the measuring repeatability and the measuring precision of position measurements with interferometers and interferometer components.

The present invention provides an interferometric device for position measurement including:
  a laser light source for supplying the measuring light required for position measurement;
  at least one first beam splitter for splitting the measuring light into a first partial beam path and a second partial beam path, which each impinge on a reflecting surface of the moveable element via an interferometer;
  a second beam splitter, provided in the first or second partial beam paths for directing a third partial beam path onto an etalon for reference measurement via an interferometer;
  a third splitter being arranged downstream of at least the beam splitter, which splits the measuring light into a first partial beam path and a second partial beam path, and the second beam splitter which directs the third partial beam path onto an etalon via the interferometer, wherein the beam splitter directs the measuring light in the first partial beam path and the second partial beam path onto the respective reflecting surface of the moveable element, or in that a fourth beam splitter is arranged upstream of the first beam splitter and at least one respective reflecting element is provided in the first partial beam path and the second partial beam path, which directs the measuring light onto the reflecting surface of the moveable element.

Further, it is an object of the present invention to create a coordinate measuring machine with which the precision and repeatability with respect to position measurements of a measuring stage are enhanced.

The present invention also provides a coordinate measuring machine including:
  a measuring stage moveable in a X coordinate direction and a Y coordinate direction;

two reflecting surfaces are provided on the measuring stage;

a laser light source, for supplying a measuring light required for position measurement of the measuring stage;

at least one first beam splitter; for splitting the measuring light into a first partial beam path and a second partial beam path, which impinge on a reflecting surface of the measuring stage via an interferometer;

a second beam splitter, provided in the first or second partial beam paths for directing a third partial beam path onto an etalon for reference measurement via an interferometer;

at least the first beam splitter, which splits the measuring light into a first partial beam path and a second partial beam path, and the third beam splitter, which directs the third partial beam path onto an etalon via an interferometer, and at least the first beam splitter, which splits the measuring light into a first partial beam path and a second partial beam path, and the second beam splitter, which directs the third partial beam path onto an etalon via an interferometer have a respective third beam splitter arranged downstream of them for directing the measuring light in the first partial beam path and the second partial beam path onto the respective reflecting surface of the measuring stage, or in that the beam splitter has a beam splitter arranged upstream of it, and in the first partial beam path and the second partial beam path respective reflecting elements are provided, which direct the measuring light onto the reflecting surface of the measuring stage.

It is advantageous if a beam splitter is arranged downstream at least of the beam splitter of the interferometric device which splits the measuring light into a first beam path and a second beam path, and of the beam splitter which directs the third beam path onto an etalon via an interferometer. This beam splitter directs the measuring light in the first and second partial beam paths onto the respective reflecting surface of the moveable element. A further embodiment provides that a beam splitter is arranged upstream of the beam splitter which splits the measuring light into the first and second partial beam paths. In this embodiment, in the first and second partial beam paths, respective reflecting elements are provided for directing the measuring light on the reflecting surface of the moveable element 20. The beam splitters can each have a beam trap associated with them for trapping the light reflected back by each of the interferometers. It is the purpose of the apparatus according to the present invention to prevent light from passing back into the laser or the interferometer. To minimize this effect, the division ratios of the beam splitters present in the interferometric device are to be configured in such a way that back reflections into the laser and/or the interferometer are minimized, wherein, however, sufficient light is still present for the interferometric determination of the position of the measuring stage.

A further beam splitter may be provided in the first partial beam path and/or the second partial beam path for directing the first partial beam path onto the reflecting surface of the moveable element via the interferometer. This further beam splitter also has a beam trap associated with it for trapping the light reflected back by the interferometer. Furthermore, the further beam splitter has a detector associated with it for measuring the light passing through the further beam splitter.

It has been found advantageous if the further beam splitters are formed as 50/50 splitters. The moveable element is also a measuring stage arranged moveable in the X coordinate direction and the Y coordinate direction.

A further advantageous embodiment of the interferometric device provides a beam splitter in the measuring light of the laser light source. This beam splitter redirects the measuring light onto the beam splitter which splits the measuring light into a first beam path and a second beam path. The beam splitter has a detector associated with it for receiving the light coming from the laser light source and the light transmitted by the beam splitter.

The beam splitter provided in the measuring light downstream of the light source may be formed as a 50/50 splitter or as a 33/67 splitter. In the embodiment, in which a beam splitter is used downstream of the laser light source, the further beam splitters of the interferometric device are formed as mirrors which direct the light in the first partial beam path and in the second partial beam path on the reflecting surfaces of the moveable object.

The beam traps and/or the mirrors also may have adjusting elements associated with them, allowing an inclination, with respect to the reflecting surface of the moveable element, to be adjusted in such a way that a light beam impinging on the reflecting surface at least partially overlaps a light beam reflected by the reflecting surface. The degree of overlap can also be determined. This is important since only overlapping or interfering beams can deliver the results required for the measurement.

The interferometric device may be used, in particular, in a coordinate measuring machine. The coordinate measuring machine is for determining positions of structures on a substrate. The coordinate measuring machine comprises a measuring stage moveable in the X coordinate direction and the Y coordinate direction. A substrate is placed on this measuring stage. The measuring stage itself has two reflecting surfaces onto which a laser light source is directed so that it is possible to measure the position of the measuring stage. At least one beam splitter is provided for position measurement, which splits the measuring light of the laser light source into a first beam path and a second beam path. Each of these partial beam paths is directed onto the reflecting surface of the measuring stage via an interferometer. A further beam splitter is also provided in the first beam path or the second beam path for directing a third partial beam path onto an etalon for reference measurement via an interferometer. It is further conceivable that the position of the measuring objective with respect to the plane of the measuring stage aligned in the X coordinate direction and the Y coordinate direction can also be measured by the interferometric device. For this purpose, corresponding reflecting surfaces are also arranged on the measuring objective. The measuring objective can have its own interferometric device associated with it. It is also conceivable that a further partial beam is split from the measuring light beam coming from the laser light source, which is used for the position determination of the measuring objective in an analogous fashion to the position determination of the measuring stage.

BRIEF DESCRIPTION OF THE DRAWINGS

Exemplary embodiments of the invention and their advantages will be explained in more detail with reference to the accompanying drawings.

DETAILED DESCRIPTION

Figure 1:
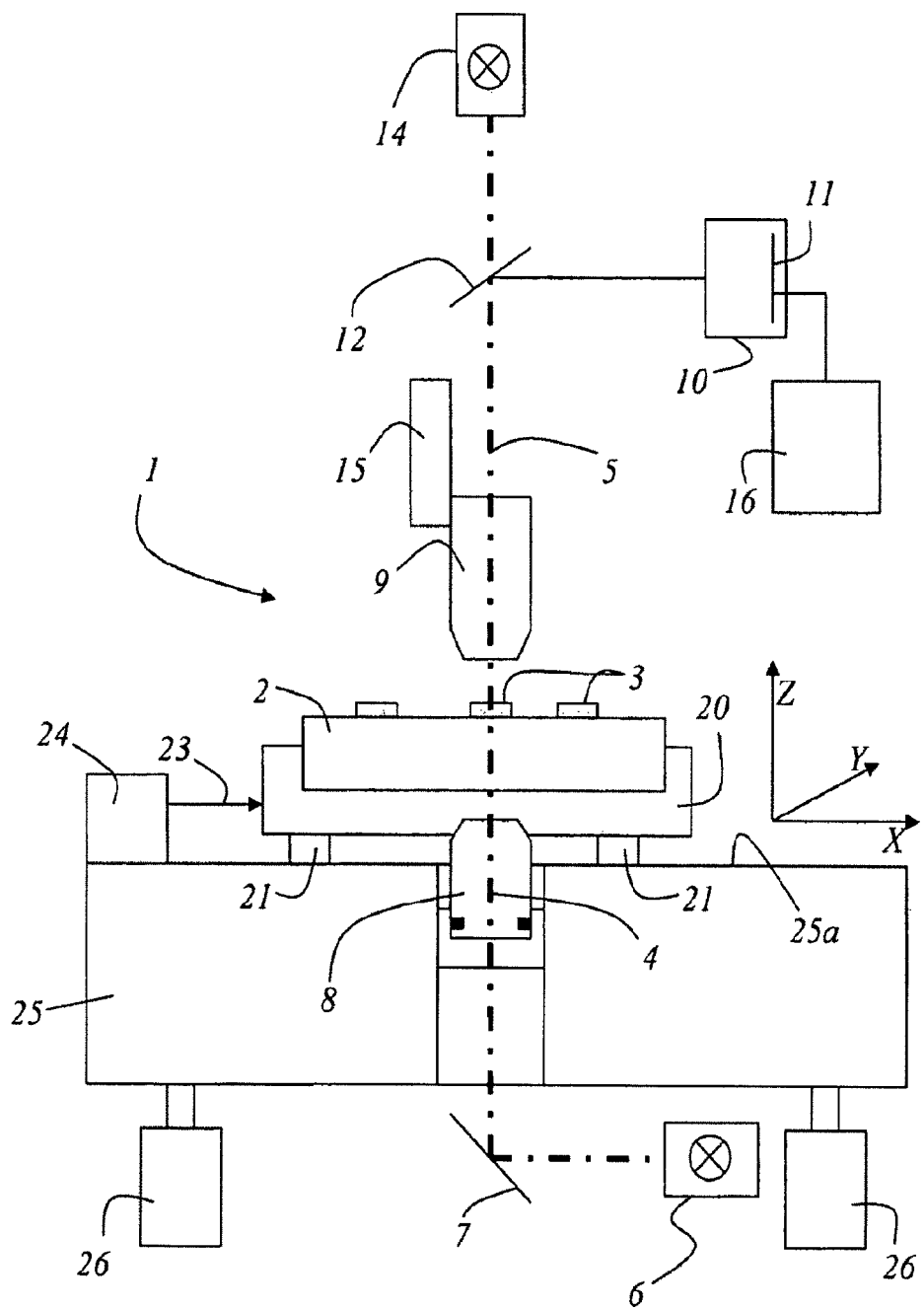
FIG. 1 is a schematic view of the structure of a coordinate measuring machine as it is well known from the state of the art.

For the same or equivalent elements of the invention, identical reference numerals will be used. Further, only reference numerals will be shown in the figures for clarity, which are necessary for describing each figure. The embodiments shown are only examples of how the apparatus according to the present invention can be configured and are not an exhaustive limitation.

A coordinate measuring machine 1 of the type shown in FIG. 1 is repeatedly known from the prior art and also described there. For completeness sake, the functioning and arrangement of the individual elements of the coordinate measuring machine will be explained. It should also be noted that a coordinate measuring machine 1 can be used to measure positions of structures 3 on the surface 2a of a substrate 2 (mask for the manufacture of semiconductors). These measurements are carried out optically. Herein, the measuring stage 20, which is formed as a reflecting body, is traversed in a plane 25a in the X coordinate direction and the Y coordinate direction, so that a structure 3 to be measured on the surface 2a of the substrate is brought into the optical axis 5 of the measuring objective 9. The position of each structure to be measured is determined with respect to the coordinate system of the coordinate measuring machine.

Measuring stage 20 is traversable in a plane 25a formed on element 25. Element 25, in a preferred embodiment, is a granite block. It goes without saying for a person skilled in the art, however, that element 25 could also be of a different material which ensures a precise plane 25a for displacing measuring stage 20. The position of the measuring stage is measured by means of at least one laser interferometer 24 emitting a light beam 23 for the measurement. The element 25 itself is supported on vibration dampers to isolate building vibrations from the coordinate measuring machine 1. Measuring stage 20 itself is traversable on bearings 21 in the X coordinate direction and the Y coordinate direction. In a preferred embodiment, bearings 21 are formed as air bearings.

On the measuring stage 20, which is a reflecting body, for example, substrate 2 is placed, which carries the structures 3 to be measured. Substrate 2 can be illuminated by means of a transmitted-light illumination means 6 and/or by means of an incident-light illumination means 14. The light of the transmitted-light illumination means 6 passes onto substrate 2 via a redirecting mirror 7 and a condenser 8. The light of the incident-light illumination means 14 also passes via a measuring objective 9 onto substrate 2. Measuring objective 9 is provided with an adjusting means 15 allowing the measuring objective 9 to be adjusted in the Z coordinate direction. Measuring objective 9 collects the light coming from the substrate and directs it out of the incident-light illumination axis, or the optical axis 5, by means of a partially transmitting redirecting mirror 12. The light is directed onto a camera 10 provided with a detector. Detector 11 is connected to a computer system 16 for computing the corresponding position data of each structure to be measured on substrate 2 from measuring values determined by detector 11. Parallel thereto, the required correction of the scaling error due to the ambient air pressure is also carried out by computer system 16.

Figure 2:
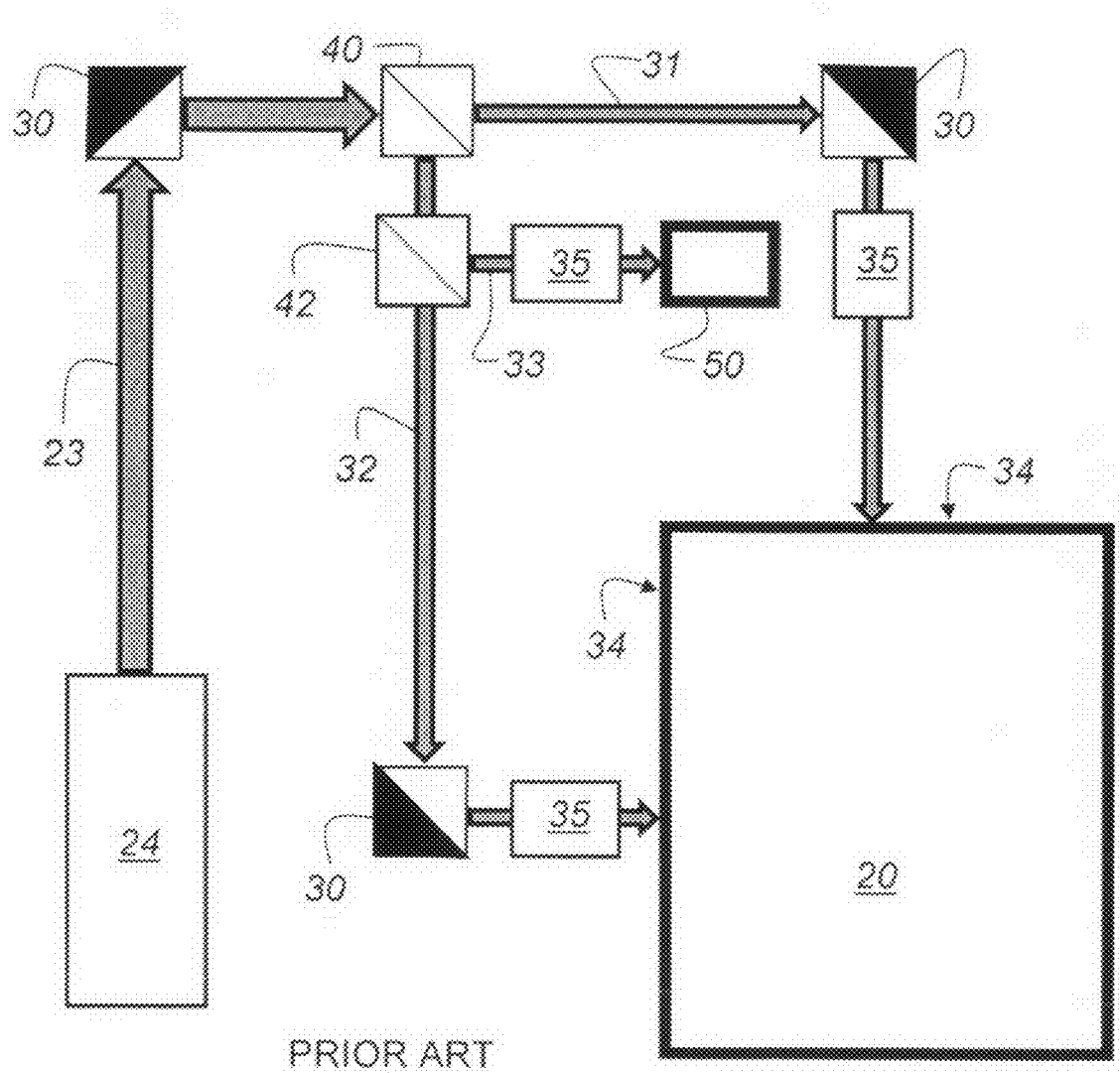
FIG. 2 shows a schematic arrangement of an interferometric device according to the state of the art, in which the position measurement of the measuring stage of the coordinate measuring machine of FIG. 1 is used.

FIG. 2 is a schematic view of an interferometric device according to the state of the art. With the aid of the interferometric device, the movement of a moveable element 20 is determined in the X coordinate direction and the Y coordinate direction. The position of the moveable element is determined with reference to the coordinate system of the coordinate measuring machine 1. A laser light source 24 is provided which emits the measuring light 23 required for the position measurement. Measuring light 23 impinges on a mirror 30 which redirects the measuring light by 90°. The thus redirected measuring light impinges on a beam splitter 40 which splits the impinging measuring light into a first partial beam path 31 and a second partial beam path 32. First partial beam path 31 impinges on a further mirror 30, which redirects the measuring light in the direction toward a reflecting surface 34 of measuring stage 20. A mirror 30 is also arranged in the second partial beam path for also redirecting the measuring light onto another reflecting surface 34 of measuring stage 20. The reflecting surfaces 34 are essentially parallel to the X and Y coordinate axes of the coordinate system. Each of the measuring beam paths is directed onto the reflecting surfaces 34 of the moveable element 20 via an interferometer 35. For determining the reference wavelength, a further beam splitter 42 can be provided in the first partial beam path 31 or in the second partial beam path 32 for directing a third partial beam path 33 onto an etalon 50 via an interferometer 35.

Figure 3:
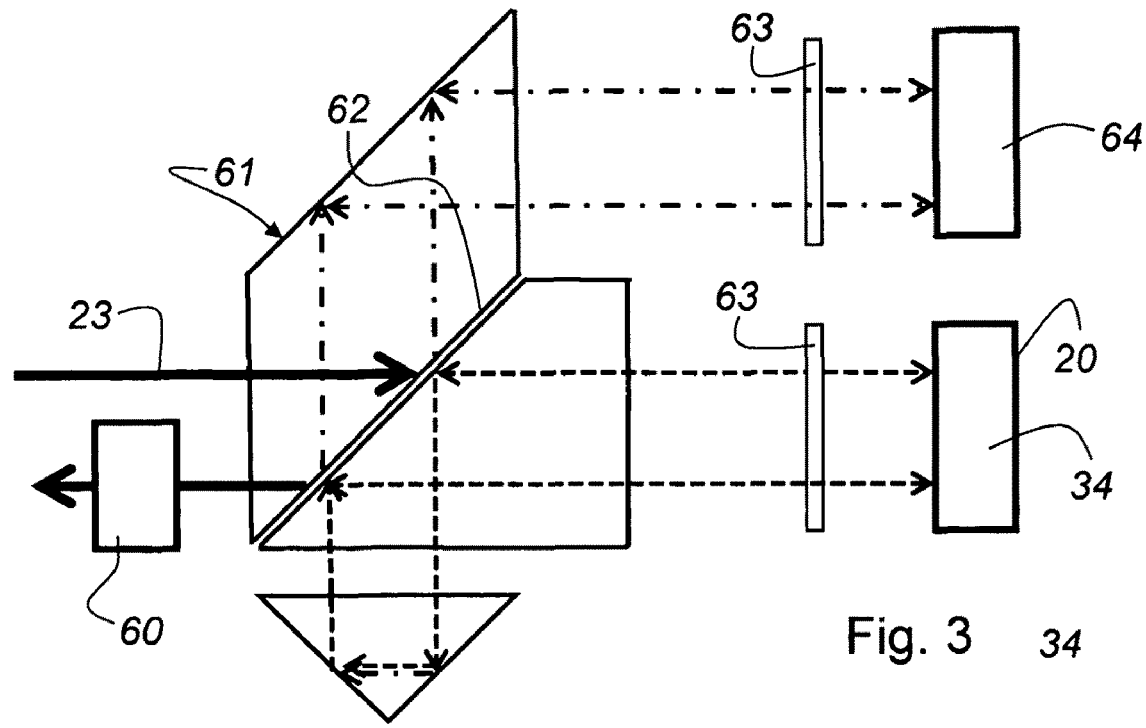
FIG. 3 is a schematic view of the path of the light beams in the interferometer.

FIG. 3 is a schematic view of the path of the laser light between the interferometer, the measuring mirror 34 and the reference mirror 64. The measuring light 23 coming from the laser light source 24 comprises two partial beams vertically polarized with respect to each other. After the reflection of the two beams on the measuring object or on the reflecting surface 34 of the moveable element 20 and their parallel offset within interferometer 35, these two partial beams are overlapped again and are fed to a coupling-out optics 60 in a measuring signal receiver (not shown). Theoretically, such systems have the highest precision if the beams are redirected precisely by 90° or 180°. This means that not linearly polarized light would return to its point of origin, if it is redirected in this direction in the splitter. In the present case, the interferometers are of a design which ensures that the laser beam vertically impinges on the boundary surface defined by the interferometer glass body. Lambda-quarter-plates 63 are also provided in the beam path, within which the beams in the interferometer are repolarized. In all reflections shown in FIG. 3, reflections occur on all optical transitions, or coupling-out of the polarized beams into the wrong path takes place. Since the beam redirections only deviate little from 90° or 180°, the beams return on the input path in the direction toward the laser light source 24. This returning light leads to instability in the laser frequency. As already mentioned, the laser frequency is a standard value for the measurement. If this standard value is changed or the frequency in the laser differs from that at the measuring site (data age), the determined measuring value has an error. It is known, that the feedback of the beam (from the interferometer) onto the laser light source itself can be minimized by minimizing the intensity after leaving the laser light source (for example by a splitter situated directly downstream from the laser light source, or upstream of the beam splitter or redirecting mirror 30, which splits the measuring light into a first beam path 31 and a second beam path 32). Furthermore, it is known that by inclining the interferometer or the beam by means of a coupling-in mirror, the so-called non-linear interferometer errors can also be minimized. They occur due to reflections or due to a crosstalking of the beams with different polarizations undesirable from the design point of view. Inclination prevents the reflected portion returning on itself. The reflections from the interferometer back toward the splitter, could not be observed, however, with arrangements according to the state of the art. The minimization of the interferometer errors was carried out by inclining the coupling-in mirrors to the interferometers. It could only be determined by time-consuming measurements which state had been achieved by the coupling. Short-term analysis of the amplitude of the interferometer measuring beam after passing through the arrangement did not show sufficient sensitivity.

Figure 4:
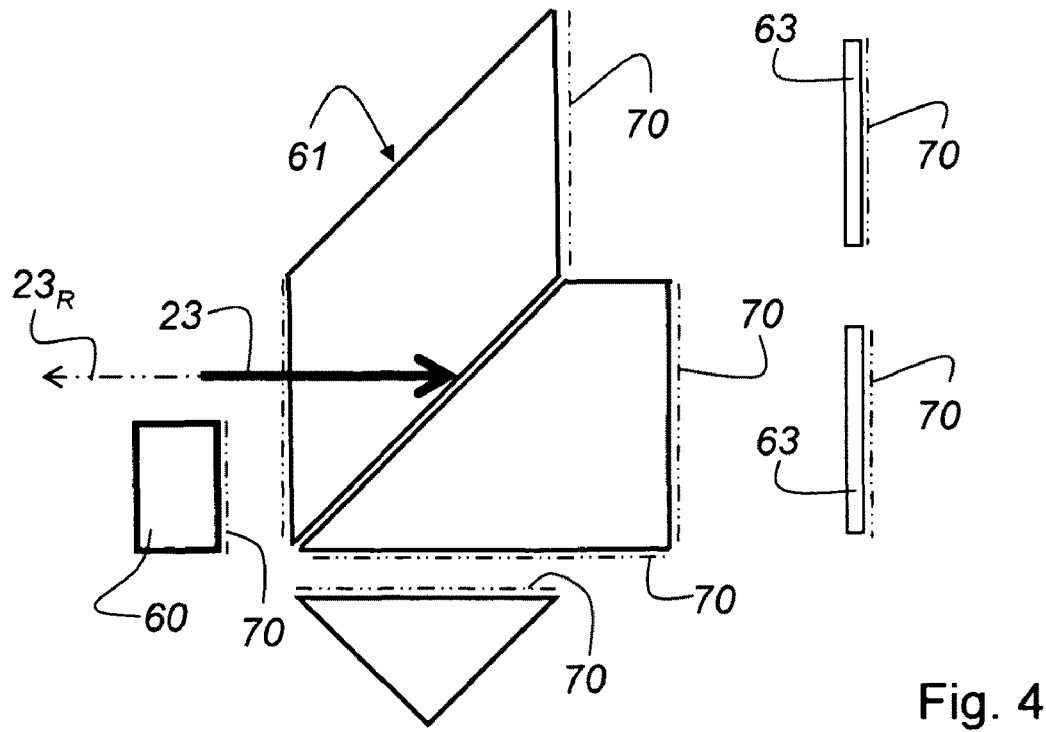
FIG. 4 shows a schematic arrangement of reflecting surfaces in an interferometer as used in the present invention.

FIG. 4 is a schematic view of the boundary surfaces of the interferometer and the coupling-out optics. The boundary services 70 in the view shown in FIG. 4 are indicated with a dash-dotted line. As already mentioned, a certain proportion $23_R$ of the measuring light beam 23 of laser light source 24 impinges on the glass body 61 of the interferometer. This proportion $23_R$ has a negative effect on the laser light source, as already mentioned.

Figure 5:
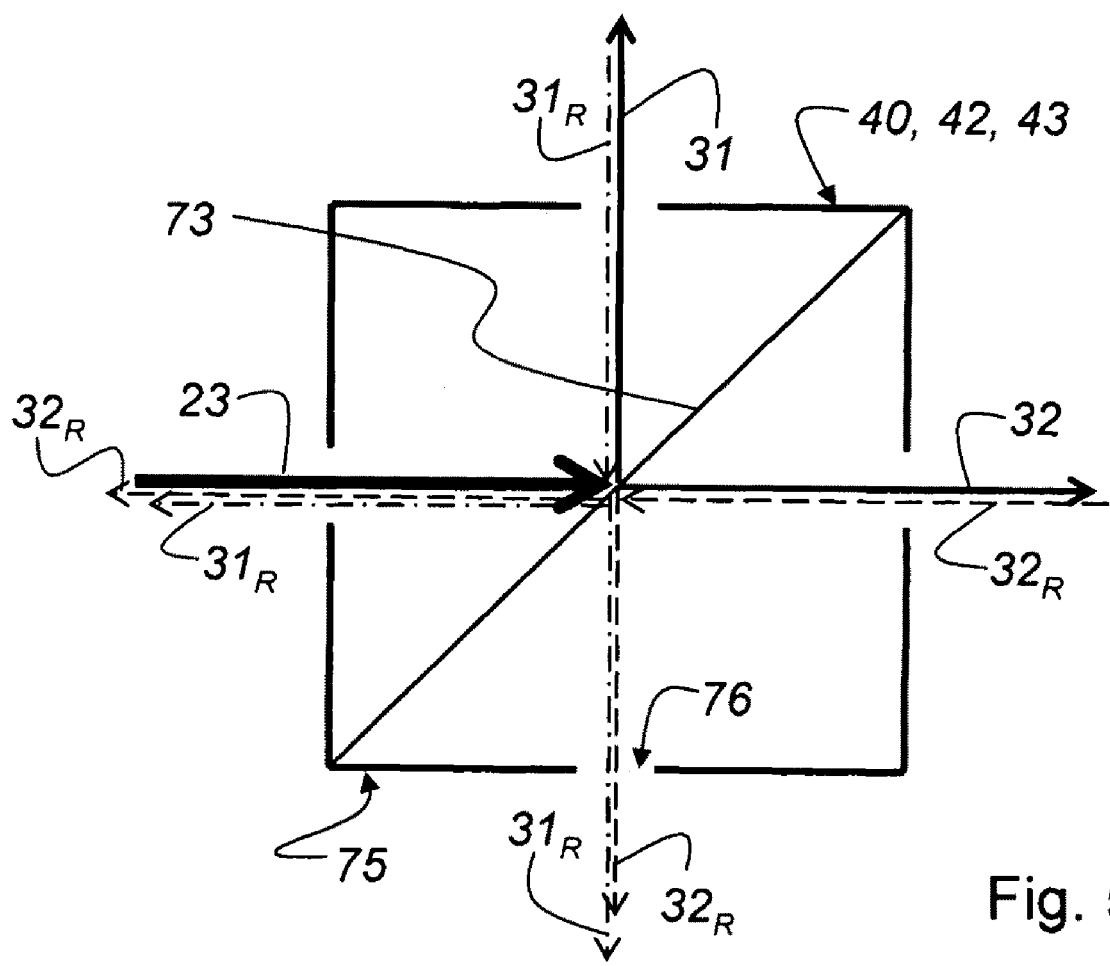
FIG. 5 is a schematic view of a beam splitter and the beams extending at the beam splitter.

FIG. 5 is a schematic view of a first, second or third beam splitter 40, 42, 43, as used in the present invention. The measuring light 23 coming from the laser light source is shown as a thick arrow. The first partial beam path 31, or the second partial beam path 32, split by the splitting layer 73 of first, second or third splitter 40, 42 and 43 are also shown as solid lines. The light $31_R$ and $32_R$, respectively, returning from the interferometers (not shown) are indicated as dash-dotted and dashed lines, respectively. The returning light $32_R$ is reflected once on the reflecting layer 73 of first, second or third beam splitter 40, 42, 43, and is transmitted once through layer 73. Also, light $31_R$ returning from the interferometer is reflected on and transmitted through the reflecting layer 73 of first, second or third beam splitter 40, 42, 43. As can be unambiguously seen from FIG. 5, light $31_R$ and $32_R$, which is reflected by the interferometers, thus returns to the laser light source 24 (not shown). First, second or third beam splitter 40, 42, 43 is provided in a holder 75. A bore 76 is provided in holder 75 of first, second or third beam splitter 40, 42, 43, through which beams $31_R$ and $32_R$ returning from the interferometer can exit. This is how reflections are avoided within the holder 75 of first, second or third beam splitter 40, 42, 43 which could also return toward the laser or the interferometer. The light $31_R$ and $32_R$ returning into the laser also causes a disturbance in the overall measurement. The returning light can disturb the stability of the laser itself (freebling, cf. article D. Musinsky, Cygo). Furthermore, a reference signal is generated by the laser itself. This reference signal is ultimately the length unit with which the information generated by the interferometers is standardized. The returning light causes fluctuations of this reference signal. They are regulated to a certain threshold by a control unit in the laser, but the regulation has a latency, or different delays of the light must be calculated. If fluctuations fall below the threshold of the control unit, this leads to imprecisions in the measuring value. If the reflected light is reduced in relation to the output signal, this causes minimizing of the fluctuations.

Figure 6:
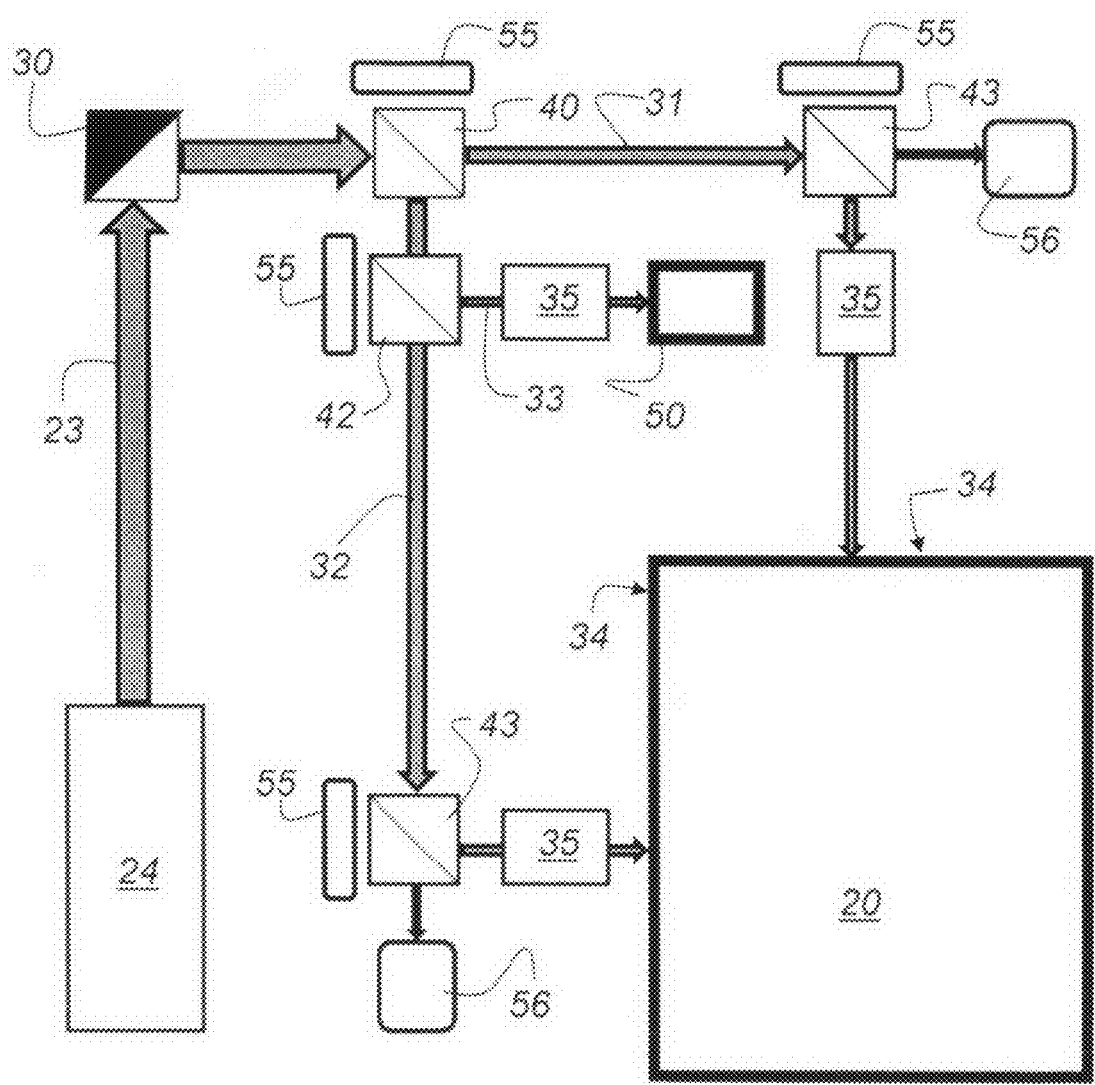
FIG. 6 is a view of the interferometric device according to the present invention with which the position of a measuring stage or a moveable element is determined.

FIG. 6 shows a schematic view of an embodiment of the present inventive interferometric device. In the embodiment shown in FIG. 6, the measuring light 23 emitted by the laser light source 24 first passes to a redirecting mirror 30. From redirecting mirror 30, the measuring light passes to first beam splitter 40, which splits the measuring light 23 into a first partial beam path 31 and a second partial beam path 32. In the first partial beam path 31 or in the second partial beam path 32, a second beam splitter 42 can also be provided, which directs a portion of the measuring light onto an etalon 50 via an interferometer 35. Third beam splitters 43 are provided in the first partial beam path 31 and the second partial beam path 32, which also direct the measuring light onto the reflecting surface 34 of the moveable element 20 (measuring stage) via an interferometer 35. As already mentioned in the description with reference to FIG. 5, holder 75 for the respective third beam splitter 43, which directly receives the light returning from interferometer 35, is provided with a bore 76. Behind bore 76, a beam trap 55 is arranged, by which the light coming out of first, second or third beam splitter 40, 42, 43 is obliterated. By this obliteration of the light, a reference signal of the laser light source 24 is subject to substantially less disturbance. The arrangement shown in FIG. 6 has the advantage, for example, that in this case the two redirecting mirrors 30, which direct the measuring light onto the reflecting surfaces 34 of the moveable element have been offset with respect to third beam splitter 43 upstream of the interferometers 35. These third beam splitters 43 are formed as 50/50 splitters. The light originally impinging on beam splitter 43 is therefore weakened by 50%. The light returning from the interferometer is weakened by 50% again. This is how a substantial weakening of the light is achieved, which leads to reduced disturbance of the reference signal of the laser light source 24. In the arrangement shown in FIG. 6, the coupling interference and the minimization of the light returning into the laser can be achieved, which is additionally helped by the already mentioned light traps 55.

Figure 7:
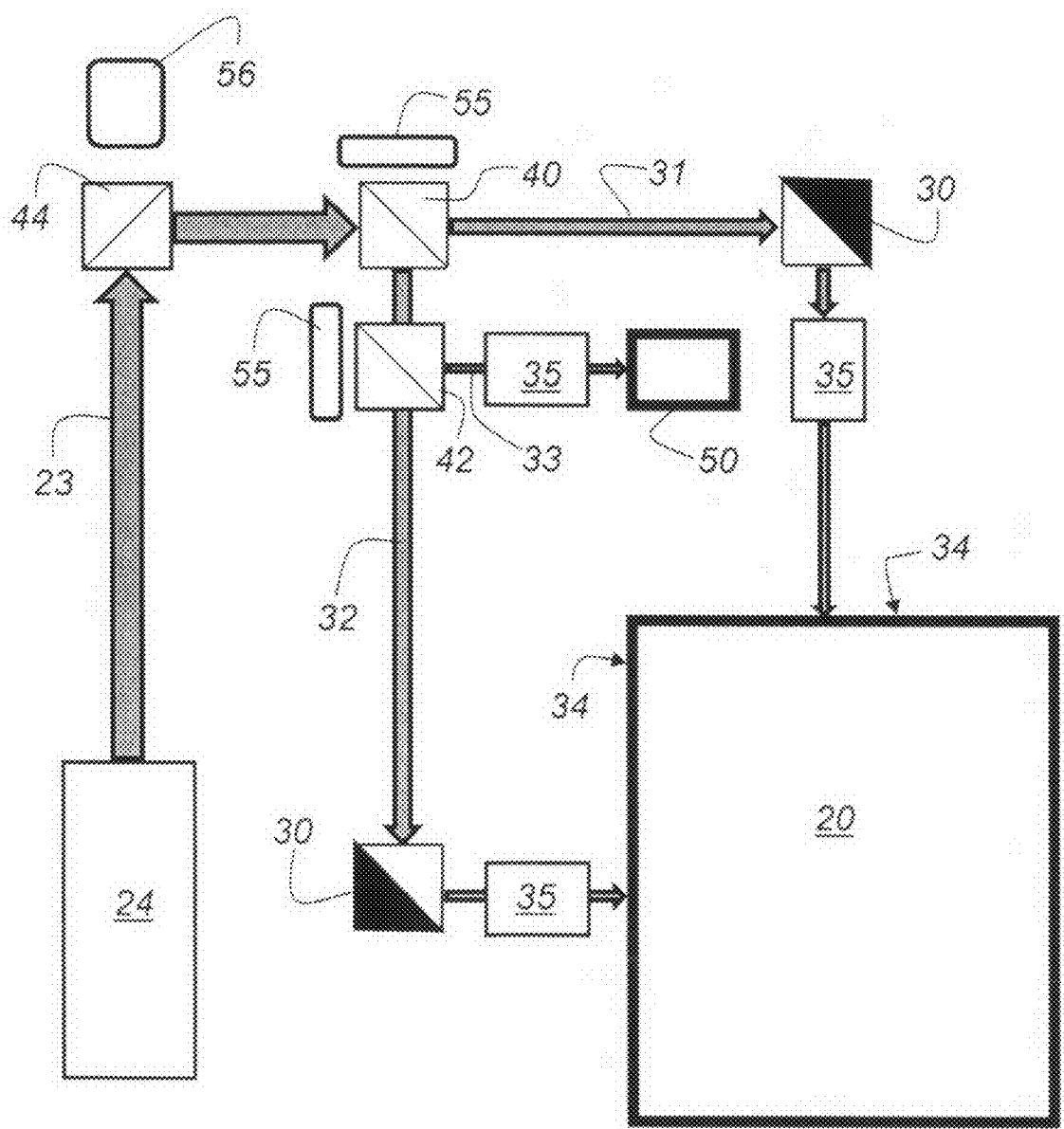
FIG. 7 shows a schematic arrangement of a further embodiment of the present invention, by which the position of a measuring stage or a moveable element is also interferometrically measured.

FIG. 7 shows a further embodiment of the interferometric device according to the present invention, with which back reflections into the laser light source 24 can be minimized. FIG. 7 differs from the view of the state of the art of FIG. 2 in that the redirecting mirror 30 immediately downstream from the laser light source 24 has been replaced by a fourth beam splitter 44. The use of neutral filters, in so far as they do not disturb the polarization of the light, is also an alternative for minimizing freebling and crosstalk. As can be seen from the view of FIG. 6 and FIG. 7, a detector 56 is provided downstream of the respective beam splitters 43 in FIG. 6 and the fourth beam splitter 44 in FIG. 7. These third and fourth beam splitters 43 and 44, respectively, are also formed as 50/50 splitters and offer the possibility to connect these detectors 56. An external beam frequency (reference frequency of the undisturbed laser beam) can be driven as well as an additional etalon. Analyzing the light portions reflected by the interferometers is possible by means of further detectors, at least as far as the value is concerned, which can be installed for adjustment purposes instead of the beam traps 55. These detectors 56, which are installed instead of the beam traps 55, allow the inclination to be observed and documented. In the variant shown in FIG. 7, the light reflected by the interferometers 35 is only directed in the dividing ratio of first beam splitter 40 toward fourth beam splitter 44, which is immediately downstream of laser light source 24. The other portion is absorbed by beam trap 55, or can be used for adjustment purposes if a detector 56 is used. The measuring light 23 coming from laser light source 24, which is not deflected, also passes onto a detector 56, which can be used for the generation of reference signals.

Figure 8:
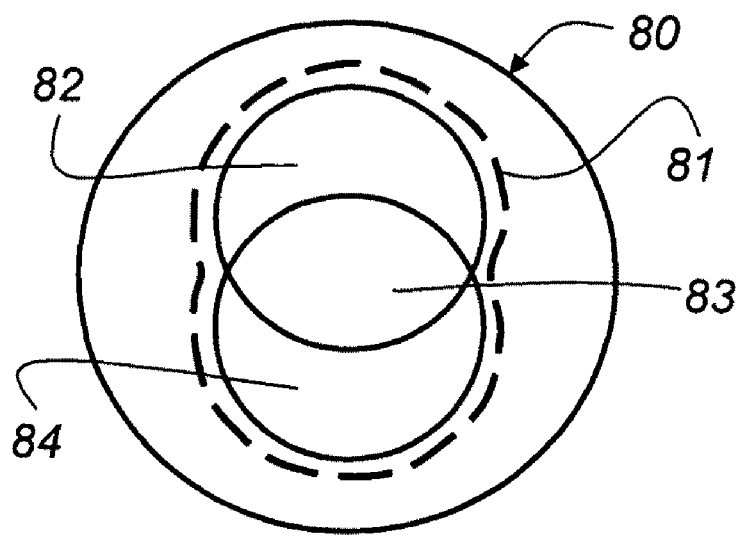
FIG. 8 is a schematic view of the two laser beams with different polarization which overlap at the output of the interferometer depending on the inclination of the beams.

FIG. 8 is a schematic view of the two laser beams with different polarization, which can be overlapped in the interferometer output depending on each inclination of the beam-carrying and reflecting elements. As already mentioned, the non-linear interferometer error can be minimized by inclining the interferometers 35 itself, or the mirrors 30, or the second and third beam splitters 42, 43, which are arranged directly upstream of the interferometers 35. It has been shown that inclining the mirrors 30 or the second and third beam splitters 42, 43 is mechanically easier to realize since the holders for the second and third beam splitters 42, 43, or for the mirrors 30, already have an adjusting element (not shown). The inclination is obviously within very narrow limits, since the two beams in the interferometer output 80 must sufficiently overlap. The installation of adjusting elements (not shown) in the case of using second and third beam splitters 42, 43 is useful, since the degree of the inclination can be controlled immediately. Detector 56 ultimately supplies an indication showing the degree of overlap of incoming beam 82 in relation to reflected beam 84. As long as the incoming beam 82 and the outgoing beam 84 have an overlap region 83, the inclination is within the required range to reduce the back reflection into the laser light source 24. The overlap region is shown as the outline 81. The installation of detectors 56 on second and third beam splitters 42 and 43, respectively, can immediately supply an indication of the effect of the inclination.

The invention has been described with reference to a preferred embodiment. It is conceivable for a person skilled in the art, however, that modifications or changes can be made in the invention without thereby leaving the scope of protection of the appended claims.

What is claimed is:

1. An interferometric device for position measurement of an element moveable in a plane, comprising:
   a laser light source for supplying measuring light required for position measurement;
   one first beam splitter for splitting the measuring light into a first partial beam path and a second partial beam path;
   a second beam splitter provided in the first beam path for directing a third partial beam path onto an etalon for reference measurement via an interferometer;
   one or more third beam splitters each positioned in one of the first partial beam path and the second partial beam path, so that the one of the first partial beam path and the second partial beam path impinge on reflecting surfaces of the moveable element via a respective interferometer; and
   a respective beam trap associated with each of the first beam splitter, the second beam splitter and the third beam splitter, each beam trap trapping light returned by one of the interferometers,
   wherein the one or more third beam splitters includes a plurality of third beam splitters formed as 50/50 splitters.

2. The interferometric device according to claim 1, wherein the plurality of beam splitters include a respective detector is associated with each of the third beam splitters in addition to the respective beam trap and each detector measures the light transmitted by the respective third beam splitter.

3. The interferometric device according to claim 1, wherein the beam traps also comprise an adjusting element, via which an inclination with respect to the reflecting surface of the moveable element is adjustable in such a way that an overlap of a light beam impinging on the reflecting surface with a light beam reflected by the reflecting surface is determinable.

4. The interferometric device according to claim 1, wherein the one or more third beam splitters include a first third beam splitter positioned in the first partial beam path and a second third beam splitter positioned in the second partial beam path, so that the first partial beam path and the second partial beam impinge on a reflecting surface of the moveable element via the respective interferometers of the first and second third beam splitters.

5. The interferometric device according to claim 4 further comprising a first detector downstream of the first third beam splitter and a second detector downstream of the second third beam splitter, the first third beam splitter splitting the first partial beam path such that part of the first partial beam path impinges on the reflecting surface and part of the first partial beam path impinges on the first detector, the second third beam splitter splitting the second partial beam path such that part of the second partial beam path impinges on the reflecting surface and part of the second partial beam path impinges on the second detector.

6. A coordinate measuring machine for determining the positions of structures on a substrate comprising:
   a measuring stage moveable in a X coordinate direction and a Y coordinate direction;
   two reflecting surfaces are provided on the measuring stage;
   a laser light source, for supplying a measuring light required for position measurement of the measuring stage;
   at least one first beam splitter for splitting the measuring light into a first partial beam path and a second partial beam path;
   a second beam splitter, provided in the first partial beam path for directing a third partial beam path onto an etalon for reference measurement via an interferometer;
   one or more third beam splitters each positioned in one of the first partial beam path and the second partial beam path, so that the one of the first partial beam path and the second partial beam path impinge on reflecting surfaces of the moveable element via a respective interferometer; and
   a respective beam trap associated with each of the first beam splitter, the second beam splitter and the third beam splitter, each beam trap trapping light returned by one of the interferometers,
   wherein the one or more third beam splitters includes a plurality of third beam splitters formed as 50/50 splitters.

7. The coordinate measuring machine according to claim 6, wherein the one or more third beam splitters includes a plurality of beam splitters and the third beam splitters each have a detector associated therewith for measuring the light transmitted by the respective third beam splitter, in addition to the beam trap, which traps the light returned from the respective interferometer.

8. The coordinate measuring machine according to claim 6, wherein the beam traps also comprise an adjusting element, via which an inclination with respect to the reflecting surface of the measuring stage is adjustable in such a way that an overlap of a light beam impinging on the reflecting surface with a light beam reflected by the reflecting surface is determinable.

9. The coordinate measuring machine according to claim 6, wherein the one or more third beam splitters include a first third beam splitter positioned the first partial beam path and a second third beam splitter positioned in the second partial beam path, so that the first partial beam path and the second partial beam impinge on a reflecting surface of the moveable element via the respective interferometers of the first and second third beam splitters.

10. The interferometric device according to claim 9 further comprising a first detector downstream of the first third beam splitter and a second detector downstream of the second third beam splitter, the first third beam splitter splitting the first partial beam path such that part of the first partial beam path impinges on the reflecting surface and part of the first partial beam path impinges on the first detector, the second third beam splitter splitting the second partial beam path such that part of the second partial beam path impinges on the reflecting surface and part of the second partial beam path impinges on the second detector.

11. An interferometric device for position measurement of an element moveable in a plane, comprising:
   a laser light source for supplying measuring light required for position measurement;
   one first beam splitter for splitting the measuring light into a first partial beam path and a second partial beam path;
   a second beam splitter provided in the first beam path for directing a third partial beam path onto an etalon for reference measurement via an interferometer;
   one or more third beam splitters each positioned in one of the first partial beam path and the second partial beam path, so that the one of the first partial beam path and the second partial beam path impinge on reflecting surfaces of the moveable element via a respective interferometer, the one or more third beam splitters including a first third beam splitter positioned in the first partial beam path and a second third beam splitter positioned in the second partial beam path, so that the first partial beam path and the second partial beam impinge on a reflecting surface of the moveable element via the respective interferometers of the first and second third beam splitters;
   a respective beam trap associated with each of the first beam splitter, the second beam splitter and the third beam splitter, each beam trap trapping light returned by one of the interferometers; and
   a first detector downstream of the first third beam splitter and a second detector downstream of the second third beam splitter, the first third beam splitter splitting the first partial beam path such that part of the first partial beam path impinges on the reflecting surface and part of the first partial beam path impinges on the first detector, the second third beam splitter splitting the second partial beam path such that part of the second partial beam path impinges on the reflecting surface and part of the second partial beam path impinges on the second detector.

12. A coordinate measuring machine for determining the positions of structures on a substrate comprising:
   a measuring stage moveable in a X coordinate direction and a Y coordinate direction;
   two reflecting surfaces are provided on the measuring stage;
   a laser light source, for supplying a measuring light required for position measurement of the measuring stage;
   at least one first beam splitter for splitting the measuring light into a first partial beam path and a second partial beam path;
   a second beam splitter, provided in the first partial beam path for directing a third partial beam path onto an etalon for reference measurement via an interferometer;
   one or more third beam splitters each positioned in one of the first partial beam path and the second partial beam path, so that the one of the first partial beam path and the second partial beam path impinge on reflecting surfaces of the moveable element via a respective interferometer, the one or more third beam splitters including a first third beam splitter positioned the first partial beam path and a second third beam splitter positioned in the second partial beam path, so that the first partial beam path and the second partial beam impinge on a reflecting surface of the moveable element via the respective interferometers of the first and second third beam splitters;
   a respective beam trap associated with each of the first beam splitter, the second beam splitter and the third beam splitter, each beam trap trapping light returned by one of the interferometers; and
   a first detector downstream of the first third beam splitter and a second detector downstream of the second third beam splitter, the first third beam splitter splitting the first partial beam path such that part of the first partial beam path impinges on the reflecting surface and part of the first partial beam path impinges on the first detector, the second third beam splitter splitting the second partial beam path such that part of the second partial beam path impinges on the reflecting surface and part of the second partial beam path impinges on the second detector.

* * * * *